United States Patent [19]

Inakuma et al.

[11] Patent Number: 5,609,902

[45] Date of Patent: Mar. 11, 1997

[54] METHOD FOR CONTINUOUS ROASTING OF FOOD MATERIALS

[75] Inventors: Takahiro Inakuma; Hiroyasu Furui, both of Tochigi; Yoshinori Tokugawa, Hiroshima; Fumiaki Tsuda, Hiroshima; Mitsuo Nagai, Hiroshima; Shuitsu Kirihara, Hiroshima, all of Japan

[73] Assignees: Kagome Co., Ltd., Nagoya; The Japan Steel Works, Ltd., Tokyo, both of Japan

[21] Appl. No.: 392,494

[22] Filed: Feb. 22, 1995

[30] Foreign Application Priority Data

Nov. 29, 1994 [JP] Japan .................................. 6-294972

[51] Int. Cl.⁶ ............................................... A23L 1/00
[52] U.S. Cl. ............................................ 426/466; 426/519
[58] Field of Search ........................ 426/466, 519, 426/523; 99/348; 366/320

[56] References Cited

U.S. PATENT DOCUMENTS 5,327,817  7/1994  Zittel ......................................... 99/348
5,358,331  10/1994  Cruse ...................................... 366/320

FOREIGN PATENT DOCUMENTS

| 0379755 | 8/1990 | European Pat. Off. . |
| 1114765 | 4/1956 | France . |
| 3904008 | 8/1990 | Germany . |
| 490061 | 6/1970 | Italy . |
| 2082447 | 3/1982 | United Kingdom . |

*Primary Examiner*—George Yeung
*Attorney, Agent, or Firm*—Sughrue, Mion, Zinn, Macpeak & Seas

[57] ABSTRACT

The method and apparatus of the invention for the continuous roasting of food materials are such that the food material being fed into a heated tubular cylinder is mixed up within and transferred through said tubular cylinder while the vaporized components of the food material are recovered and cooled to liquefy. The apparatus may comprise the horizontally placed tabular cylinder with an open front end, the coil screw inserted into the tubular cylinder in such a way that it can be driven to rotate, and the cooling unit that is connected to a vent port formed in the middle part of the tubular cylinder.

7 Claims, 3 Drawing Sheets

METHOD FOR CONTINUOUS ROASTING OF FOOD MATERIALS

FIELD OF THE INVENTION

The present invention relates to a continuous roasting method and apparatus for the drying and concentration of food materials or the continuous production of sautéd vegetable and roasted flavors.

RELATED ART

A common method of pan-frying or sautéing food materials consist of placing a small amount of oil in a heated pan, putting in food materials and heating it together with the oil. Being one of the easiest methods of cooking, pan-frying is often employed at home to cook a small amount of food materials in a pan and there is no problem with this method since the cook has a good command of the situation and requires little or no attention.

To roast large volumes of the food materials, industrial pan-fryers of various types are currently used and they may be classified as one of three types according to the shape of the pan and the cooking process: an "escargot" type fryer, a "cup" type fryer, and a fryer with an agitator.

For cooking with an "escargot" type fryer, a pan with a "snail" shaped bottom is rotated slowly as it is positioned horizontally. The food materials being heated move slowly along the inner periphery of the pan, where it is collected temporarily. If the pan is further rotated to incline at an angle, the food materials drop under gravity along the inner periphery. As it drops, the food materials change its direction in two different ways by means of small paddles so that it is given an agitating effect. In addition, the head by which the food materials drop gives an impetus for dissipating surplus vapor. Upon repetition of these steps, the food materials are cooked.

A "cup" shaped fryer comprises a pan in the form of a cup that is provided on the inner periphery with one or two plates or projections for carrying up the food materials. The pan is not usually fitted with a cover. For cooking, the pan is rotated as it is inclined at a small angle with the open top facing up. The food materials are carried up from the bottom of the pan by means of the plate(s) or projection(s) on the inner periphery and turned upside down to be given an agitating effect.

A fryer with an agitator is of such a construction that the food materials in a fixed pan is sautéd as it is stirred with a paddle- or ribbon-type agitator that undergoes a planetary motion. Examples of this type of fryer may be found in Examined Japanese Patent Publication Sho 57-38255 and Unexamined Published Japanese Utility Model Application Sho 62-136193.

Food flavors can be produced by three typical methods, extraction with various solvents, distillation and pressing.

Unexamined Published Japanese Patent Application Sho 62-126935 teaches a method of coffee extraction, in which roasted coffee beans are compressed with a twin-screw extruder with hot water being supplied, thereby achieving separation between the extract of water-soluble components from the coffee beans and the residue.

Unexamined Published Japanese Patent Application Sho 59-74966 teaches a method of recovering aroma from roasted cereals, in which method water is added to the ground particles of roasted cereals to form a solution, which is subjected to distillation of water vapor or boiling in a heating vessel, so that the extract is separated from the vapor phase, which is then cooled to liquify for subsequent recovery.

Unexamined Published Japanese Patent Application Hei 2-104265 teaches a process for producing a ptisan extract that comprises a first step in which ptisan is brought into contact with water vapor and a concentrate containing the volatile aroma component of ptisan is obtained, a second step in which the ptisan's residue occurring after recovery of the aroma component in the first step is extracted with an aqueous solvent to obtain an extract, and a third step in which the extract obtained in the second step is mixed with the concentrate containing the volatile aroma component of ptisan.

The above-described prior art methods for pan-frying (or roasting) food materials and for extracting food flavors have had their own problems. Each of the three types of roasters ("escargot" type, "cup" type, and roaster with an agitator) is practically incapable of continuous operation and has to be operated in a batch system. However, even if the settings of the conditions for operation in successive batches are identical, the actual processing status somewhat varies from batch to batch, causing differences in the quality of the products from individual batches. As a further problem, each type of the conventional roasters causes a large amount of food materials to be agitated as individual pieces contact one another and, hence, those food materials which are tender or which have been tender will deform unavoidably.

Food materials such as vegetable will generate flavor upon roasting but with the conventional methods and apparatus, roasting and extraction are performed separately and cannot be effected simultaneously.

SUMMARY OF THE INVENTION

The present invention has been accomplished under these circumstances and an object thereof is to provide a method by which food materials can be roasted continuously to recover roasted flavors without deformation irrespective of the initial shape of the food materials.

Another object of the present invention is to provide an apparatus for implementing that method.

The object of the present invention can be attained by a method for continuous roasting of food materials, in which food materials based on a foodstock in a powder, particulate, chip or shredded form is mixed up within and transferred through a horizontally placed, heated tubular cylinder with open ends.

The object of the invention can also be attained by a method for continuous roasting of food materials, in which food materials based on a foodstock in a powder, particulate, chip or shredded form is supplied continuously from an inlet at a rear end of a horizontally placed, heated tubular cylinder with an open front end, mixed up and transferred by means of a coil screw within said tubular cylinder, and discharged continuously from an outlet at the other end of said tubular cylinder.

In a specific embodiment, said food materials are supplied quantitatively from the inlet on said tubular cylinder and mixed up and transferred as it fills no more than one half of the cross-sectional area of the bore through said tubular cylinder.

In another specific embodiment, said food materials have at least one substance selected from among an edible oil, water and a seasoning added to said foodstock.

In yet another specific embodiment, the vaporized components of said food materials are vented from at least one location on said tubular cylinder in which said food materials are mixed up and through which it is transferred.

In a more specific embodiment, the vaporized components of said food materials being vented from said tubular cylinder are recovered and cooled to liquefy.

In still another specific embodiment, said food materials are heated in selected areas at different temperatures as it is mixed up and transferred from the inlet to the outlet on said tubular cylinder.

The object of the present invention can be attained by an apparatus for continuous roasting of food materials that comprises:

a tubular cylinder that is placed horizontally, that has an inlet in the rear end portion and an open outlet in the front end portion and that has a bore of a circular cross section formed therethrough;

a heating unit provided at least partly around said tubular cylinder;

a coil screw rotatably inserted into the bore of said tubular cylinder;

a rotating shaft that is connected to the rear end of said coil screw and that is rotatably supported through the rear end portion of said tubular cylinder; and a rotational drive unit connected to said rotating shaft;

said coil screw being adapted to rotate while contacting the inner surface of said tubular cylinder.

In a specific embodiment, the apparatus is furnished with a feed adjustable supply unit for supplying said tubular cylinder through the inlet with food materials based on foodstocks in a powder, particulate, chip or shredded form.

In another specific embodiment, said tubular cylinder has a vent port formed with the opening facing up in at least one location between said inlet and said outlet.

In a more specific embodiment, said vent port is coupled to a conduit and a cooling unit.

In yet another specific embodiment, said heating unit consists of a plurality of heating elements aligned on the longitudinal axis of said tubular cylinder that are capable of independent temperature control.

In still another specific embodiment, said heating unit is provided in a selected area of the lower part of the circumference of said tubular cylinder.

In another specific embodiment, said tubular cylinder is fitted in the front end portion with a support unit having a supporting disc that is capable of rotation in a plane perpendicular to the longitudinal axis of said tubular cylinder, wherein said supporting disc rotatably supports the front end portion of said coil screw and wherein said support unit is held movable along the longitudinal axis of said tubular cylinder.

In yet another specific embodiment, said support unit comprises a support plate that is supported in the front end portion of said tubular cylinder in such a way as to be capable of movement along the longitudinal axis of said tubular cylinder by means of a plurality of thread members and said supporting disc that is mounted on said support plate in such a way as to be capable of rotation via a bearing in a plane perpendicular to the longitudinal axis of said tubular cylinder.

In the method and apparatus for continuous roasting of food materials according to the invention, food materials based on a foodstock in a powder, particulate, chip or shredded form is supplied from the inlet into the hot tubular cylinder, where it is heated with the hot tubular cylinder, mixed up and transferred progressively toward the outlet with the coil screw.

The coil screw slides as it keeps intimate contact with the entire circumference of the bore in the tubular cylinder, so that the food materials in the lower part of the bore is scooped or scraped up by means of the coil screw, whereby it is mixed up sufficiently to be roasted.

In order to assure that the food materials fill no more than one half of the cross-sectional area of the bore through the tubular cylinder, the food materials those feed are determined by a specific roasting time or throughput is supplied from the inlet by means of the supply unit in a continuous and quantitative manner.

Since the food materials fills no more than one half of the cross-sectional area of the bore in the tubular cylinder, the small amount of it is adequately mixed up and heated in every part of the bore.

The inlet and the outlet on the tubular cylinder are open, so vaporized components such as water vapor that are generated in the process of roasting of the food materials will be vented through the inlet and the outlet. If one or more vent ports are provided in the middle portion of the tubular cylinder, the vaporized components will also be vented effectively through those vent ports. If necessary, an edible oil, water or a seasoning may be added through such vents.

The foods material supplied into the tubular cylinder may be supplemented with the necessary amount of an edible oil, water or seasoning, which can be added in an effective manner either simultaneously with the supply of the food materials or at an appropriate time in the process of its roasting and at an appropriate site.

In the method and apparatus for producing sautéd vegetable and roasted flavors according to the present invention, food materials based on vegetable in a shredded or chip form are supplied into the horizontally placed, heated tubular cylinder with an open front end and is then mixed up within and transferred through the tubular cylinder, whereby it is progressively heated and roasted evenly. The roasted food material generates a flavor, which is incorporated in the water vapor that results from the evaporation of the moisture in the food materials. The evaporated components of the food materials are recovered from the vent port on the tubular cylinder, whereby the flavor in the water vapor is recovered together with the latter and the evaporated or vaporized components are cooled to liquefy, thus producing an aqueous solution of the roasted flavor. In the meantime, the food materials are freed of moisture to become sautéd vegetable, which is discharged from the open distal end of the tubular cylinder. As the food materials are supplied at a specified proportion and processed under specified conditions, a given quantity of the food materials are roasted at all times within the tubular cylinder and the roasted food materials are discharged in a given proportion.

The horizontally placed tubular cylinder has the inlet in the rear portion with the opening facing up. The food materials are supplied into the tubular cylinder through this inlet. Water vapor containing the roasted flavor is vented out of the tubular cylinder via the vent port that is provided in the middle portion of the tubular cylinder and which has an opening that faces up. The roasted food materials are discharged from the tubular cylinder through the outlet which is open at the front end. The heating elements provided at least partly around the tubular cylinder will heat the latter at specified temperatures so that the heated tubular cylinder will heat the internally supplied food materials until it are roasted. The coil screw rotatably inserted in to the bore of a circular cross section through the tubular cylinder is driven to rotate at a specified speed so that it will mix up the supplied food materials while transferring it progressively from the rear to the front end at a specified speed. The conduit and the cooling unit which are connected to the vent port have such a function that the roasted flavor containing water vapor that is generated within the tubular cylinder and which is vented from the vent port is cooled to liquefy.

The food materials supplied into the tubular cylinder are heated optimally by means of a plurality of independently temperature controllable heating elements in such a way that the heating temperature varies along the transfer of said food materials in order to roast wiht adequate temperature depending upon the degree of which roasting has progressed.

The support unit in the apparatus for continuous roasting varies the degree of elastic compression of the coil screw, whereby not only the degree of contact between the coil screw and the bore in the tubular cylinder but also the force of this contact is adjusted.

The heating unit in the apparatus for continuous roasting heats only the lower part of the circumference of the tubular cylinder, whereby that part of the bore through the tubular cylinder in which the food materials stays can effectively be heated.

DETAILED DESCRIPTION OF THE PREFERRED EMBODIMENTS

Figure 1:
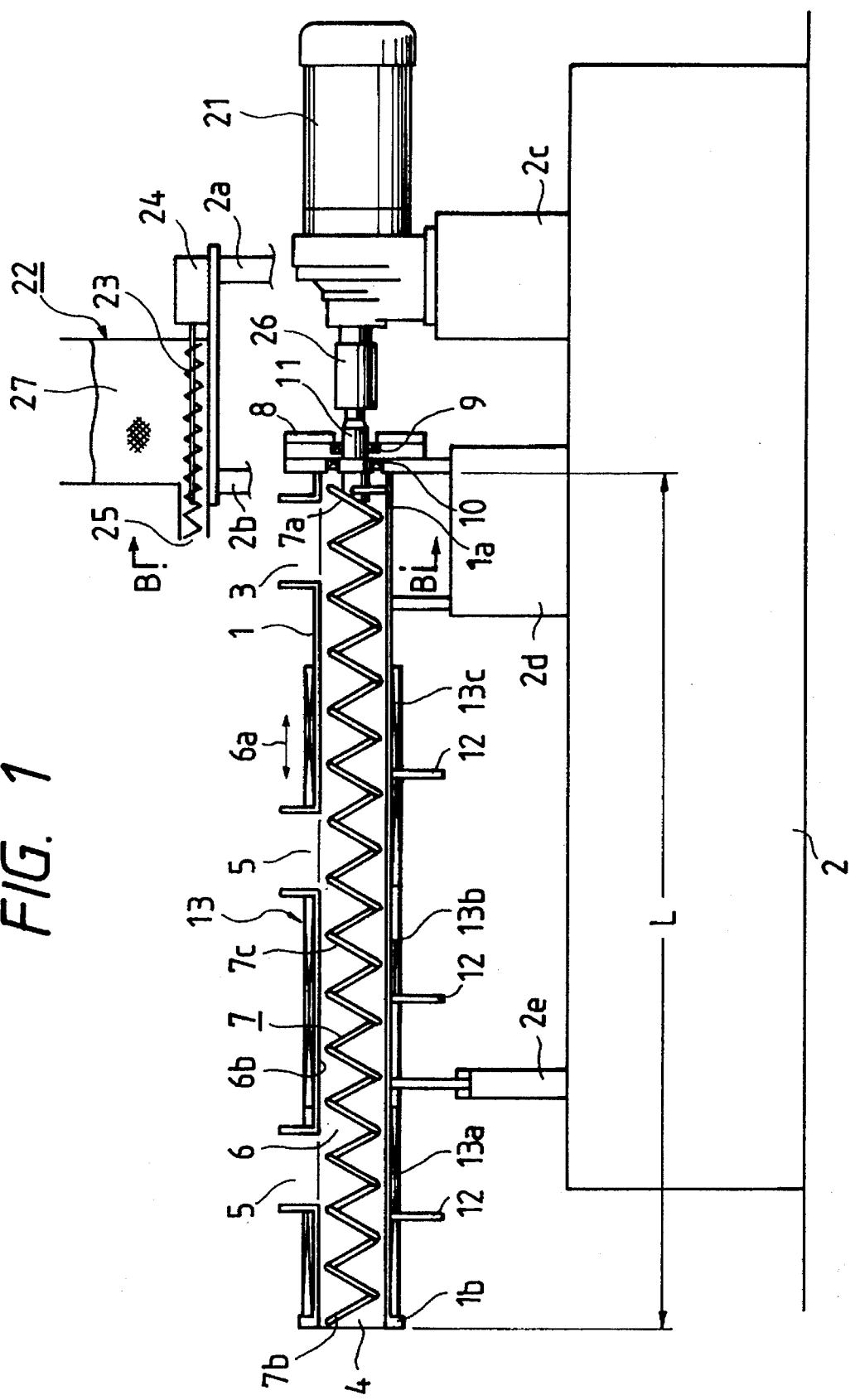
FIG. 1 is a cross section showing the general layout of an apparatus for the continuous roasting of food materials according to an embodiment of the invention.
Figure 2:
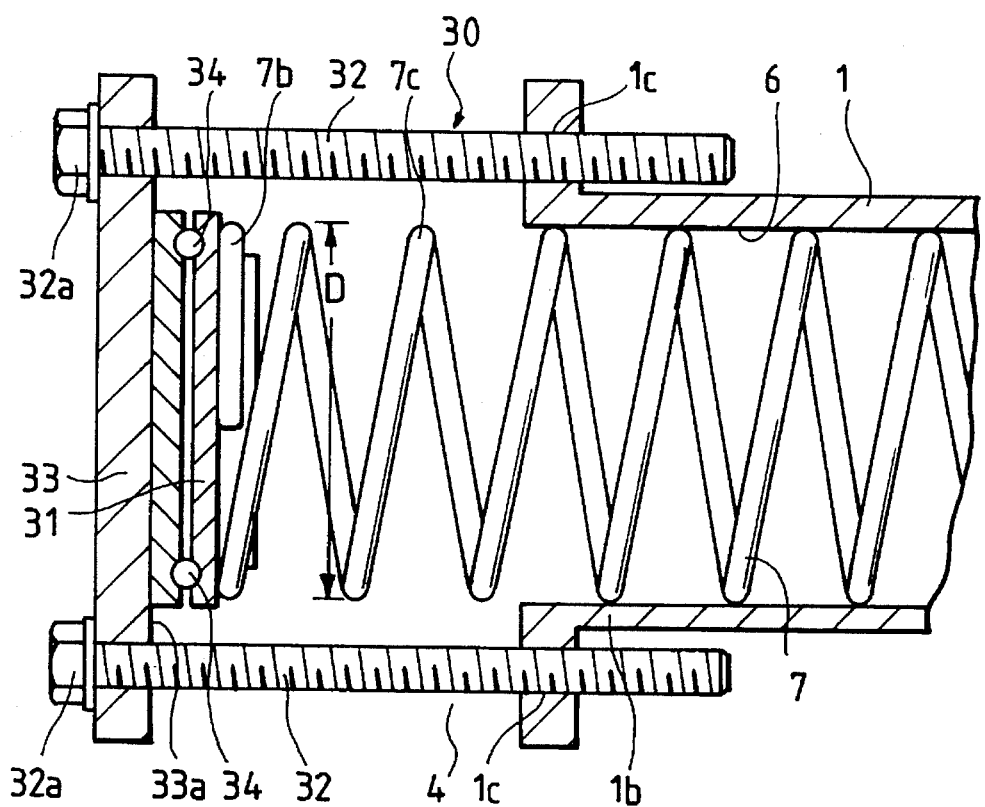
FIG. 2 is cross section showing enlarged the front end portion of FIG. 1.
Figure 3:
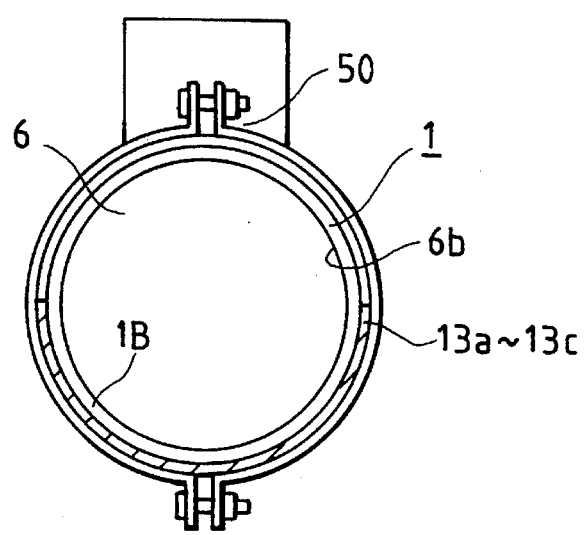
FIG. 3 is a cross section showing another example of the heating unit shown in FIG. 1.
Figure 4:
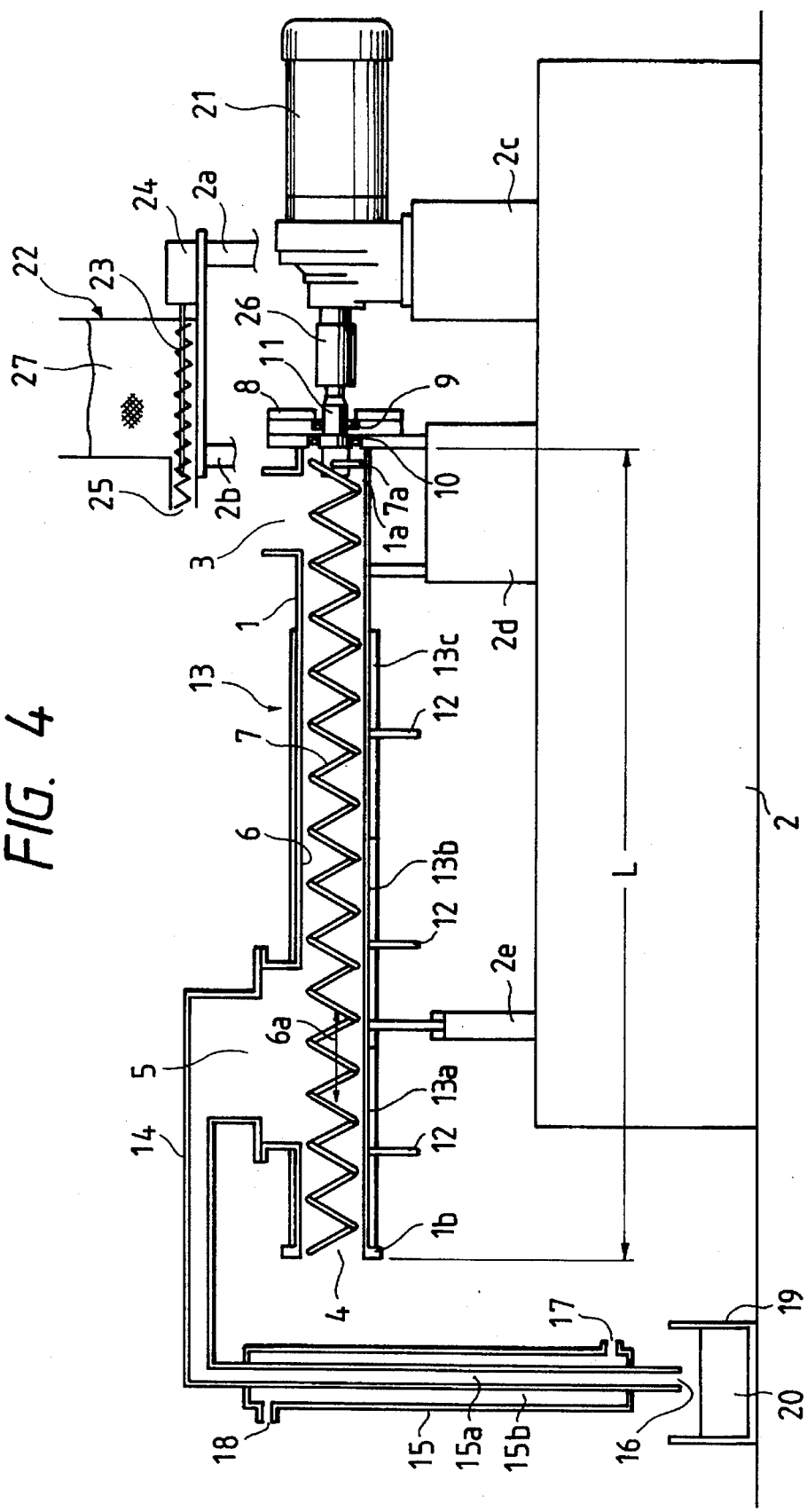
FIG. 4 is a cross section showing the general layout of an apparatus for the continuous roasting of food materials according to another embodiment of the invention.

Preferred embodiments of the method and apparatus for the continuous roasting of food materials in accordance with the present invention are described below in detail with reference to the accompanying drawings. FIGS. 1 to 5 show the apparatus for continuous roasting according to the invention, in which FIG. 1 is a sectional view showing the general layout of the apparatus, FIG. 2 is a sectional view showing the front portion of FIG. 1, FIG. 3 is a sectional view showing another embodiment of the heating unit, and FIG. 4 is a sectional view showing the general layout of another embodiment.

Shown by numeral 1 in FIGS. 1 to 3 is an elongated tubular cylinder placed horizontally over a platform 2 via legs 2d and 2e. The tubular cylinder 1 has a bore 6 that extends through it and which has a circular cross section as taken perpendicular to the axis. The tubular cylinder 1 has in its rear end portion 1a an inlet 3 that has an opening that faces up and it has at the front end 1b an outlet 4 that is defined by the open end of the bore 6. The inlet 3 may be open in facing up above the horizontal.

Vents 5 with openings that face up are formed between the inlet 3 and the outlet 4 on the tubular cylinder 1. The bore 6 in the tubular cylinder 1 which has a circular cross section contains a coil screw 7 that is made of an elastic material and which is inserted rotatably. The screw 7 may be formed of a wire that is wound in a coil having a slightly smaller diameter than the bore 6. The rear end 7a of the coil screw 7 is connected to a rotating shaft 11 that is rotatably supported through a flange 8, via a bearing 9 and a packing 10, that is provided at the rear end 1a of the tubular cylinder 1. In the embodiment shown in FIG. 1, two vent ports 5 are provided but this is not the sole case of the invention and one vent port or three or more vent ports may be provided.

The front end portion 7b of the coil screw 7 may be designed as shown in FIG. 2. A support unit indicated by 30 in FIG. 2 has a supporting disc 31 against which the rear end portion 7b of the coil screw 7 is secured or allowed to abut for establishing connection. The coil screw 7, when uncompressed, has a greater length than the total length L of the tubular cylinder 1 in the longitudinal direction and it is compressed in the bore 6 in the longitudinal direction (i.e., along the longitudinal axis of the bore) in such a way that it can be rotated as the outer circumference 7c makes elastic contact with the bore 6.

The support unit 30 consists of two to four threads 32 that are threadably inserted through holes 1c around the front end 1b of the tubular cylinder 1 in directions parallel to the longitudinal axis of the bore, a support plate 33 that is supported by the heads 32a of the threads 32 in a direction perpendicular to said longitudinal axis of the bore, and the supporting disc 31 which is mounted on the inner surface 33a of the support plate 33 via a bearing 34 in such a way that it is rotatable in a plane perpendicular to said longitudinal axis of the bore. By either tightening or loosening the screws 32 so that they will engage more or less with the associated holes 1c, the support plate 33 can be moved back and forth along the longitudinal axis of the bore so that it will compress more or less the coil screw 7.

Thus, the support unit 30 rotatably supports the front end 7b of the coil screw 7 by compressing it in such a way that the coil screw 7 will slide while contacting the entire circumference of the bore in the tubular cylinder 1 under an appropriate force of contact. The support unit 30 is adapted to be capable of adjusting the degree of compression as required.

The coil screw 7 is made of an elastic material that is wound in a coil or spiral form having a cylindrical exterior shape the diameter of which is almost equal to or slightly smaller than the inside diameter of the bore 6 with a circular cross section in the tubular cylinder 1. The pitch of successive turns of the coil is narrowed if the coil screw 7 is compressed along the axis of the tubular cylinder 1 and an angle defined between each turn of the coil and the axis of the tubular cylinder 1 advances 90 degrees so as to increase the diameter of the coil screw.

Being an elastic member in a spiral form, the coil screw 7 can readily deflect by itself along the axis of the tubular cylinder 1, so that even if the tubular cylinder 1 curves as a result of uneven heating, the coil screw 7 will immediately respond to absorb the curvature and rotates slidably in such a way that it contacts the bore 6 at all times.

FIG. 2 shows the case where the screws 32 engage more or less with the holes 1c at the front end 1b of the tubular cylinder 1 but this is not the sole case of the invention and an alternative design may be adopted, such that screws 32 are secured to the front end 1b of the tubular cylinder 1, engaging threadably with nuts at the distal ends on the back side of the support plate 33.

To heat the tubular cylinder 1, a heating unit 13 consisting of a plurality of heating elements 13a, 13b and 13c is provided at least partly around the tubular cylinder 1. The respective heating elements have their own temperature sensors 12 so that they are capable of independent temperature control. Thus, the temperature of the tubular cylinder 1 can be controlled in any position along the longitudinal axis 6a of the bore 6 through the tubular cylinder 1 depending upon the progress of the roasting operation.

The rotating shaft 11 is connected via a joint 26 to a first rotational drive unit 21 such as a motor that is mounted on the platform 1 via a leg 2c. The first rotational drive unit 21 drives the coil screw 7 to rotate.

A supply unit 22 is mounted above the inlet 3 so that a food material 27 (e.g., a powder such as wheat flour, cereal grains, beans, various kinds of vegetable, meat, tea leaves and fruit) is supplied through a discharge port 25 into the tubular cylinder 1 through the inlet 3 by mean of an extrusion screw 23 that is rotationally driven with a second rotational drive unit 24 such as a motor and which supplies an adjusted amount of the feed in a quantitative manner. The supply unit 22 is mounted on the platform 2 via legs 2a and 2b.

If desired, the heating unit 13 may be constructed as shown in FIG. 3 by providing a plurality of heating elements 13a to 13c in the lower part of the circumference of the tubular cylinder 1 along the longitudinal axis 6a of the bore 6 with the aid of a clamp 50; designed in this way, the heating unit 13 is capable of heating only those areas of the tubular cylinder 1 which are necessary for roasting the food material.

The actual case of roasting the feed with the design of the foregoing description will now be discussed in detail. First, a food material 27 based on a foodstock in a powder, particulate, chip or shredded form is loaded in the supply unit 22. The food material 27 is not limited to a single kind of foodstock and two or more foodstocks may be mixed so that they can be roasted simultaneously.

In accordance with the time for which the food material 27 is to be toasted, the rate of its supply from the feed unit 22 is set preliminarily by the second rotational drive unit 24 for the extrusion screw 23 in such a way that a predetermined amount of the food material 27 will stay in a substantially lower part (not more than one half of the circular cross-sectional area) of the bore 6 in the tubular cylinder 1 along its entire length. In the meantime, the tubular cylinder 1 is preheated with the heating unit 13 at an optimal temperature for the roasting of the food material, with a differential temperature profile being created along the longitudinal axis 6a of the bore 6.

Even in the case where the heating unit 13 consists of three heating elements 13a to 13c which are provided in the lower part of the tubular cylinder 1, the food material 27 will stay in the lower space that exceeds no more than one half of the circular cross-sectional area of the bore 6; therefore, even if the food material 27 is scraped up, the tubular cylinder 1 which is typically made of a metal (good heat conductor) assures that the upper part which is not furnished with heating elements will also become sufficiently hot by heat conduction so that the scraped portion of the food material 27 is effectively heated.

The first rotational drive unit 21 is driven to rotate the coil screw 7 within the tubular cylinder 1 while contacting the entire circumference of the bore 6. If the coil screw 7 is furnished with the support unit 30, the force of contact with the bore 6 can be adjusted.

Subsequently, the feed unit 22 is driven so that a predetermined feed of the food material 27 is supplied continuously into the tubular cylinder 1 through the inlet 3.

As it passes through the bore 6 in the heated tubular cylinder 1, the food material 27 is heated by the inner surface 6b of the bore and scooped or scraped up by the rotating coil screw 7. The most part of the food material 27 which has been scooped or scraped up will drop before reaching the upper half of the cross section of the bore 6.

Since the food material 27 fills no more than one half of the cross-sectional area of the bore in the tubular cylinder 1, the small quantity of the food material is adequately mixed up during heating in every part of the bore.

The part of the food material 27 that adheres to the coil screw 7 will move to the upper half of the bore 6 but the rotating coil screw 7 will eventually cause it to make a full turn and descend to the lower part of the bore.

Since the coil screw 7 is in a spiral form, its rotation causes the area of contact with the bore 6 to move toward the front end 1b of the tubular cylinder 1 along the longitudinal axis 6a of the bore 6. As a result of this movement of the area of contact between the coil screw 7 and the bore 6, the food material 27 is scooped from the inner surface 6b of the bore 6 or allowed to roll on that inner surface. Additionally, the food material 27 will be moved toward the front end 1b of the tubular cylinder 1.

Thus, the outer surface of the food material 27 in the tubular cylinder 1 is roasted uniformly by heating at an appropriate time and temperature due to even contact with the inner surface 6b of the bore 6, at the same time, the food material 27 is transferred from the inlet 3 to the outlet 4 at a constant speed that is determined by the rotational speed of the coil screw 7. As a result of roasting with heat, water and other volatile components are vaporized from the food material 27, whereupon it is dried and concentrated.

The water and other volatile components that have been vaporized from the food material 27 will be vented by themselves through the open inlet 3 and outlet 4. If vent ports 5 are provided on the tubular cylinder 1, the vaporized components can be vented more easily, enabling the food material 27 to be dried and concentrated effectively.

An additive such as an edible oil, water or a seasoning may be added to the food material 27 depending upon the specific object of roasting it. These additives may be added initially as components of the food material 27; alternatively, they may be added through the inlet 3 or vent ports 5 on the tubular cylinder 1; if necessary, they may be added through openings that are specially provided in selected locations of the tubular cylinder 1. Whichever method is used, the additives should be added at appropriate times during the roasting operation.

The embodiment shown in FIG. 1 refers to the case of using a single coil screw 7 but this is not the sole case of the invention and a plurality of coil, for example, two coil screws 7 may be combined to construct a dual spiral, in which the two coil screws 7 contacting the inner surface 6b of the bore through the tubular cylinder 1 has a space defined between each turn of two coil screws in an axis direction of the tubular cylinder 1, which is greater than the size of the food material to be processed.

Experiment 1

A spring steel wire (4 mm$\phi$) was wound in a coil having an outside diameter of 65 mm and a pitch of 22 mm, thus preparing a coil screw 7 having a length of the tuburlar cylinder 1 to an outside diameter of the coil screw ratio of about 20. This coil screw 7 was compressed by the support unit 30 so that the outer circumference of the coil screw 7 would completely contact the inner surfaces of the tubular cylinder 1. Two vent parts 5 were provided on the tubular cylinder 1. Onion shredded into cubes of 5 to 10 mm in size was supplied from the supply unit 22 into the tubular cylinder 1 through the inlet 3 at a constant rate of 10 kg/h. At the same time, edible oil was supplied at a rate of 0.4 kg/h by means of a metering pump (not shown). The onion thus fed was roasted for about 1 min and 20 sec. With the two vent ports 5 being closed, the results shown in Table 1 were obtained.

TABLE 1

| Lot No. | Brix of feed, % | Temperature of cylinder, °C. | | | Brix after roasting, % | Percent concentration | Color | | |
|---|---|---|---|---|---|---|---|---|---|
| | | 1 | 2 | 3 | | | L | a | b |
| 1 | 9.6 | — | 143 | 117 | 16.4 | 170 | 23.7 | 5.3 | 10.1 |
| 2 | 9.6 | 143 | 169 | 151 | 18.3 | 190 | 17.6 | 4.9 | 7.6 |

Experiment 2

The procedure of Experiment 1 was repeated, except that the vent port 5 closer to the inlet 3 was left open. The results obtained are shown in Table 2.

TABLE 2

| Lot No. | Brix of feed, % | Temperature of cylinder, °C. | | | Brix after roasting, % | Percent concentration | Color | | |
|---|---|---|---|---|---|---|---|---|---|
| | | 1 | 2 | 3 | | | L | a | b |
| 1 | 9.6 | — | 106 | 116 | 14.7 | 153 | 25.5 | 5.2 | 10.3 |
| 2 | 9.6 | 107 | 137 | 131 | 15.5 | 162 | 23.3 | 4.5 | 9.4 |
| 3 | 9.6 | 141 | 167 | 143 | 18.5 | 193 | 15.8 | 4.8 | 6.8 |

Experiment 3

The procedure of Experiment 2 was repeated, except that the onion and salad oil were supplied at respective rates of 40 kg/h and 1.6 kg/h. The results obtained are shown in Table 3.

TABLE 2

| Lot No. | Brix of feed, % | Temperature of cylinder, °C. | | | Brix after roasting, % | Percent concentration | Color | | |
|---|---|---|---|---|---|---|---|---|---|
| | | 1 | 2 | 3 | | | L | a | b |
| 1 | 9.6 | — | 165 | 118 | 10.4 | 108 | 35.9 | 4.2 | 12.4 |
| 2 | 9.6 | — | 168 | 172 | 10.7 | 111 | 36.9 | 3.9 | 12.8 |
| 3 | 9.6 | — | 173 | 178 | 10.9 | 114 | 32.0 | 4.0 | 12.3 |

Quality Rating

The onion roasted in Experiment 1 was found to taste somewhat "raw". This defect became less noticeable in Experiment 2; it was thus verified that roasted onion of high commercial value could be obtained under the conditions employed in Experiment 2. Experiment 3 showed that roasts with varying percentage of concentration could be obtained by changing the amount of feed.

FIG. 4 shows an apparatus for the continuous roasting of food materials according to another embodiment of the invention. This is characterized by coupling a cooling unit 15 to the vent port 5 via a conduit 14. As shown, the cooling unit 15 is constructed as a sheathed pipe that consists of a central cooling pipe 15a communicating with the conduit 14 which is surrounded by a water compartment 15b having a water inlet 17 and a water outlet 18. A recovery tank 19 is provided below the distal end 16 of the cooling pipe 15a.

A method will now be described for producing sautéd vegetable and a roasted flavor simultaneously using the apparatus shown in FIG. 4. First, with temperature being monitored by means of associated sensors 12, the tubular cylinder 1 was heated with the heating unit 13. When the tubular cylinder 1 was heated to predetermined temperatures, the first rotational drive unit 21 was actuated to drive the coil screw 7 so that it would rotate at a predetermined speed. The second rotational drive unit 24 was then actuated so that the food material 27 in the supply unit 22 would be extruded quantitatively through the discharge port 25 by means of the extrusion screw 23 to be supplied into the tubular cylinder 1 via the inlet 3 in a predetermined amount. The food material 27 in the supply unit 22 is vegetable in a shredded or chip form and may optionally be supplemented with a suitable additive such as a seasoning an edible oil or water.

The food material supplied into the tubular cylinder 1 via the inlet 3 is mixed up by the rotating coil screw 7 as it is transferred progressively through the bore 6 in the tubular cylinder 1 from the inlet 3 at the rear end 1a toward to outlet 4 at the front and 1b. The coil screw 7 in the form of a spiral wire coil will mix up the food material 27 by scooping up the food material 27 from the bottom of the bore 6 in the tubular cylinder 1 by the sliding action of the wire that moves along the bore, and successive leads of the coil will allow the food material 27 to be transferred toward the front end 1b of the tubular cylinder 1. Typically, the feed of the food material 27 is regulated in such a way that it stays in a substantially lower part of the bore 6 that does not exceed one half of the cross-sectional area of the bore 6; therefore, the food material 27 is adequately mixed up by the scooping action of the coil screw 7. The food material 27, as it is mixed up and transferred from the inlet 3 toward the outlet 4, is roasted by heating with the hot tubular cylinder 1. As a result, the moisture in the food material 27 will be evaporated as water vapor and the remaining part of the food material 27 is dried and concentrated to become sautéd vegetable. The vaporized water contains a roasted flavor.

The food material 27 now in the form of sautéd vegetable is discharged successively from the tubular cylinder 1 via the outlet 4. The water vapor coming out of the food material 27 in the bore 6 of the tubular cylinder 1 will ascend to collect in the vent port 5 and thence flows through the conduit 14 toward the cooling unit 15. The water compartment 15b of the cooling unit 15 is supplied with cooling water via inlet 17 to cool the cooling pipe 15a through the surround portion of the cooling unit. The cooling water is discharged via the outlet 18. As it flows down through the cooling pipe 15a, the water vapor is cooled to liquefy and drips into the recovery tank 19 from the bottom end of the cooling pipe 15a so that it is recovered as condensed water 20 containing the roasted flavor. If necessary, an exhaust fan may be provided halfway the conduit 14 so that the water vapor can be vented more effectively.

In the embodiment just described above, more than one vent port 5 may be provided on the tubular cylinder 1 and by setting the temperature of the tubular cylinder 1 to vary along its length, roasted flavors having been vaporized at various different temperatures can be separately recovered through each vent port 5. The same embodiment refers to the case of using one unit of tubular cylinder 1 containing the coil screw 7 but this is not the sole case of the present invention and, if necessary, two or more units of tubular cylinder 1 may be set up in multiple stages so that the outlet of one cylinder is positioned above the inlet of the next cylinder. This multi-stage design has a capability of processing various kinds of the food material 27 that need be roasted under different conditions.

As will be apparent from the foregoing description, the use of the apparatus shown in FIG. 4 assures that if the food material 27 is supplied in a predetermined proportion and subjected to a steady-state roasting operation, sautéd vegetable of homogeneous quality can be produced continuously while, at the same time, condensed water 20 containing a roasted flavor can also be obtained continuously.

Experiment 4

A spring steel wire (10 mmφ) was wound in a coil having an outside diameter of 65 mm and a pitch of 22 mm, thus preparing a coil screw 7 having the length of tubular cylinder 1 to the outer diameter of the coil screw ratio of about 20. In addition, a cooling unit 15 having a heat transfer area of 500 cm$^2$ was used.

Onion shredded into cubes of 5 to 10 mm in size was supplied at a constant rate of 20 kg/h. At the same time, an edible oil was supplied at a rate of 1.2 kg/h. The tubular cylinder 1 was set to be heated at 130° C. and the coil screw 7 was driven to rotate at 55 rpm. The cooling unit 15 was supplied with tap water (20° C.) at a rate of 0.7 L/min.

The sautéd onion was found to have been roasted to a degree of about 80 and about 1.5 L of roasted (onion) flavor was obtained by 30-min operation.

Experiment 5

The procedure of Experiment 4 was repeated, except that the setting of the temperature for heating the tubular cylinder 1 was changed to 160° C. The sautéd onion was found to have been roasted to a degree of about 70 and about 2.2 L of roasted (onion) flavor was obtained by 30 min operation.

Experiment 6

Using an apparatus of the same type as used in Experiment 4, dry shredded red pepper as a food material 27 was supplied at a rate of 0.6 kg/h. At the same time, an edible oil was supplied at a rate of 2.4 kg/h. The tubular cylinder 1 was set to be heated at 130° C. and the coil screw 7 was driven to rotate at 55 rpm. In Experiment 6, no cooling water was supplied to the cooling unit 15.

By removing the solids content from the roasted product being discharged from the outlet 4 on the tubular cylinder 1, an oil with the roasted flavor of red pepper was obtained in an amount of 1.1 L by 30-min operation.

Being thusly constructed, the method and apparatus of the present invention for continuous production of roasted food material and roasted flavors offer the following advantages.

(1) The feed is supplied into the tubular cylinder from one end, transferred progressively as being mixed up, and discharged from the other end; hence, a large volume of food material can be processed continuously.

(2) The proportion by which the food material is fed into the tubular cylinder, the temperature for heating the tubular cylinder, and the rotational speed of the coil screw (i.e., the rate of mixing up and transferring the food material) can be easily maintained at constant levels and, therefore, products can be yielded consistently in large volumes with minimum variations in their quality by virtue of continuous processing.

(3) The height of the food material building up in the tubular cylinder is comparatively small, so the degree of contact between portions of the food material during mixing up is smaller than in the prior art apparatus; in addition, the height by which the food material drops after being scooped or scraped up is so small that the final product will hardly deform.

(4) The coil screw moves relative to the tubular cylinder while contacting all inner surfaces of the latter; therefore, the food material will not remain sticking to the inner surface of the tubular cylinder for a prolonged time and, instead, every portion of the food material will keep moving by changing the area of contact with the inner surface of the tubular cylinder; hence, consistent roasting can be done without burning.

(5) In the midst of processing, the operator looking at the food material being processed can immediately and readily adjust such factors as the heating temperature, processing speed, the force of contact by the coil screw and the amount of additives, whereby the occurrence of defective products can be minimized.

(6) If a vent port with an opening that faces up is provided in the middle of the tubular cylinder, almost all part of the roasted flavor that develops as a result of roasting can be recovered, making it possible to achieve simultaneous production of sautéd vegetable and roasted flavor.

(7) The apparatus of the invention is advantageous in that even if the tubular cylinder expands, curves or otherwise deforms due to uneven heating, the flexible coil screw can readily absorb the deformation so that the flexible coil screw contactly rotate at all times with the inner surface of the tubular cylinder, thereby maintaining high quality of the processed food material.

What is claimed is:

1. A method for continuous roasting of food materials, comprising the steps of:

continuously mixing a powdered, particulate, chipped or shredded food material within and transferring the food material through a horizontally placed, heated tubular cylinder with open ends while roasting the food material, said tubular cylinder having at least one heating element disposed thereon, said at least one heating element extending around at least a portion of the circumference of said tubular cylinder.

2. A method for continuous roasting of food materials, comprising the steps of:

continuously supplying a powdered, particulate, chipped or shredded food material from an inlet at an end of a horizontally placed, heated tubular cylinder with open ends;

mixing the food material and transferring the food material by a coil screw within said tubular cylinder while roasting the food material; and continuously discharging the food material from an outlet at the other end of said tubular cylinder;

wherein said tubular cylinder has at least one heating element disposed thereon, said at least one heating element extending around at least a portion of the circumference of said tubular cylinder.

3. A method according to any one of claim 1 or 2 wherein said food material is supplied quantitatively from the inlet on said tubular cylinder and mixed and transferred as it fills no more than one half of the cross-sectional area of the bore through said tubular cylinder.

4. A method according to any one of claims 1 or 2 wherein said food material has a substance selected from the group consisting of an edible oil, water and a seasoning.

5. A method according to any one of claims 1 or 2 wherein vaporized components of said food material are vented from at least one location on said tubular cylinder in which said food material is mixed and through which it is transferred.

6. A method according to claim 5 wherein the vaporized components of said food material being vented from said tubular cylinder are recovered and cooled to liquify.

7. A method according to any one of claims 1 or 2 wherein said food material is heated in selected areas at different temperatures as it is mixed and transferred from the inlet to the outlet on said tubular cylinder.

* * * * *